(12) United States Patent
Taniguchi et al.

(10) Patent No.: US 11,199,833 B2
(45) Date of Patent: Dec. 14, 2021

(54) QUALITY DETERMINATION METHOD, QUALITY DETERMINATION DEVICE, QUALITY DETERMINATION SYSTEM AND COMPUTER-READABLE NON-TRANSITORY MEDIUM

(71) Applicant: FUJITSU LIMITED, Kawasaki (JP)

(72) Inventors: Jun Taniguchi, Isehara (JP); Takeshi Soeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 16/436,972

(22) Filed: Jun. 11, 2019

(65) Prior Publication Data

US 2020/0026266 A1    Jan. 23, 2020

(30) Foreign Application Priority Data

Jul. 23, 2018 (JP) .............................. JP2018-137698

(51) Int. Cl.
*G05B 19/418* (2006.01)
*G01B 21/32* (2006.01)
*G01B 5/30* (2006.01)

(52) U.S. Cl.
CPC ....... *G05B 19/41875* (2013.01); *G01B 21/32* (2013.01); *G01B 5/30* (2013.01); *G05B 2219/32368* (2013.01)

(58) Field of Classification Search
USPC .......................................................... 702/82
See application file for complete search history.

(56) References Cited

U.S. PATENT DOCUMENTS

| 2005/0095774 A1* | 5/2005 | Ushiku | ............ | G05B 19/4184 |
|---|---|---|---|---|
| | | | | 438/222 |
| 2012/0098954 A1* | 4/2012 | Yamaguchi | ........... | H01J 37/244 |
| | | | | 348/80 |
| 2016/0290905 A1* | 10/2016 | Ayotte | ................ | G01M 5/0075 |
| 2019/0101589 A1* | 4/2019 | Chiu | ................... | G01R 1/0433 |

FOREIGN PATENT DOCUMENTS

| JP | 08-15238 | 1/1996 |
|---|---|---|
| JP | 2005-050861 | 2/2005 |

\* cited by examiner

*Primary Examiner* — Paul D Lee
(74) *Attorney, Agent, or Firm* — Fujitsu Patent Center

(57) ABSTRACT

A quality determination method includes: in a quality determination space, mapping a quality of a package product in which a plurality of devices are assembled in accordance with a predetermined design condition, with use of each test result of each of the plurality of devices; and determining a quality of the package product, on a basis of mapping result of the mapping.

14 Claims, 14 Drawing Sheets

FIG. 12

| COMBINATION | LSI THICKNESS [μm] | 1ST INDEX |
|---|---|---|
| LSI-SUBSTRATE | 100 | −55 |
| IMPROVED LSI-SUBSTRATE | 70 | 289 |

QUALITY DETERMINATION METHOD, QUALITY DETERMINATION DEVICE, QUALITY DETERMINATION SYSTEM AND COMPUTER-READABLE NON-TRANSITORY MEDIUM

CROSS-REFERENCE TO RELATED APPLICATION

This application is based upon and claims the benefit of priority of the prior Japanese Patent Application No. 2018-137698, filed on Jul. 23, 2018, the entire contents of which are incorporated herein by reference.

FIELD

A certain aspect of embodiments described herein relates to a quality determination method, a quality determination device, a quality determination system and a computer-readable non-transitory medium.

BACKGROUND

In a manufacturing process of a package product, as an assembly, devices are mounted on a substrate or the like. It is demanded that the package product manufactured by the manufacturing process satisfies a predetermined standard (for example, see Japanese Patent Application Publication No. H08-15238 and Japanese Patent Application Publication No. 2005-50861).

SUMMARY

According to an aspect of the present invention, there is provided a quality determination method including: in a quality determination space, mapping a quality of a package product in which a plurality of devices are assembled in accordance with a predetermined design condition, with use of each test result of each of the plurality of devices; and determining a quality of the package product, on a basis of mapping result of the mapping.

According to an aspect of the present invention, there is provided a quality determination system including: a terminal configured to input each test result of each of a plurality of devices of a package product in an item state and a design condition of the package product; a server having a memory and a processor coupled to the memory and the processor configured to execute a process, the process comprising: in a quality determination space, mapping a quality of the package product in which the plurality of devices are assembled in accordance with the design condition, with use of each test result of each of the plurality of devices; and determining a quality of the package product, on a basis of mapping result of the mapping.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates changing results of indices of a warp direction in a case where results of a design guidance is received and a thickness of a device is changed from 100 μm to 70 μm.

DESCRIPTION OF EMBODIMENTS

Devices in a package product are individually manufactured and individually passes a test. However, even if the devices individually pass the test, the assembled package product may not necessarily pass the test. Therefore, it is difficult to determine whether the package product passes a predetermined test before assembling.

Figure 1:
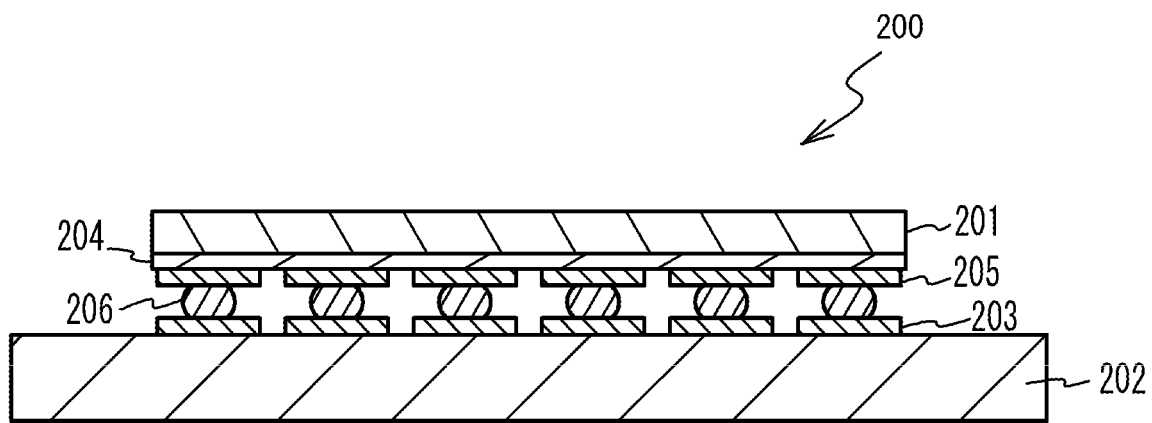
FIG. 1 illustrates a structure of a package product.

In the following, a description will be given of an example of a package product which is an object of which quality is determined. The package product is a product in which a plurality of devices are assembled (mounted or built). FIG. 1 illustrates a structure of a package product 200. As illustrated in FIG. 1, the package product 200 has a structure in which, as an assembly, a device 201 is mounted on a substrate 202. The device 201 and the substrate 202 are individually manufactured in an item state. Each of the device 201 and the substrate 202 satisfies specification and pass a test in an item state. For example, the device 201 is a semiconductor device such as a LSI (Large Scale Integration).

A plurality of electrodes 203 are provided on the substrate 202. A plurality of electrodes 205 are provided on a face of the device 201 on which a circuit 204 is provided. Each of the electrodes 203 is connected to each of the electrodes 205 through a BGA (Ball Grid Array) 206. For example, under a condition that the BGA 206 is being melted, it is possible to connect the electrode 203 with the electrode 205. The package product 200 in which the device 201 is mounted on the substrate 202 as an assembly is subjected to a test such as a burn-in-test or reliability evaluation such as a temperature cycle test. After that, the package product is shipped when the package product is determined as good.

The device 201 and the substrate 202 are composite materials in which a material and an interconnection layer are combined. Therefore, a warp occurs in each of the device 201 and the substrate 202 in an item state in accordance with temperature environment, because of a difference of thermal expansion coefficients thereof. Distortion may occur in the package product 200 after assembly mounting because of internal stress caused by the thermal expansion difference, in a range of the warp which satisfies a standard of test in an item state. In this case, connection of the BGA 206 may be broken, and a crack may occur in the device 201 and the substrate 202. Even if there is no problem after the assembly mounting, variation may occur in the manufacturing. Therefore, similar problem may occur in a test such as a burn-in test.

In order to research a problem of the assembly mounting, a plurality of prototypes are made. In this case, the process condition may be reconsidered. Alternatively, the design condition such as an external size, a thickness of each layer or an occupying rate may be corrected. There is the same problem in evaluating of reliability. Reworking may occur when a yielding percentage is increased and a high quality product is achieved.

In the following embodiments, a description will be given of a quality determination method, a quality determination device, a quality determination system and a quality determination program that are capable of determining quality of a package product before assembling.

First Embodiment

Figure 2:
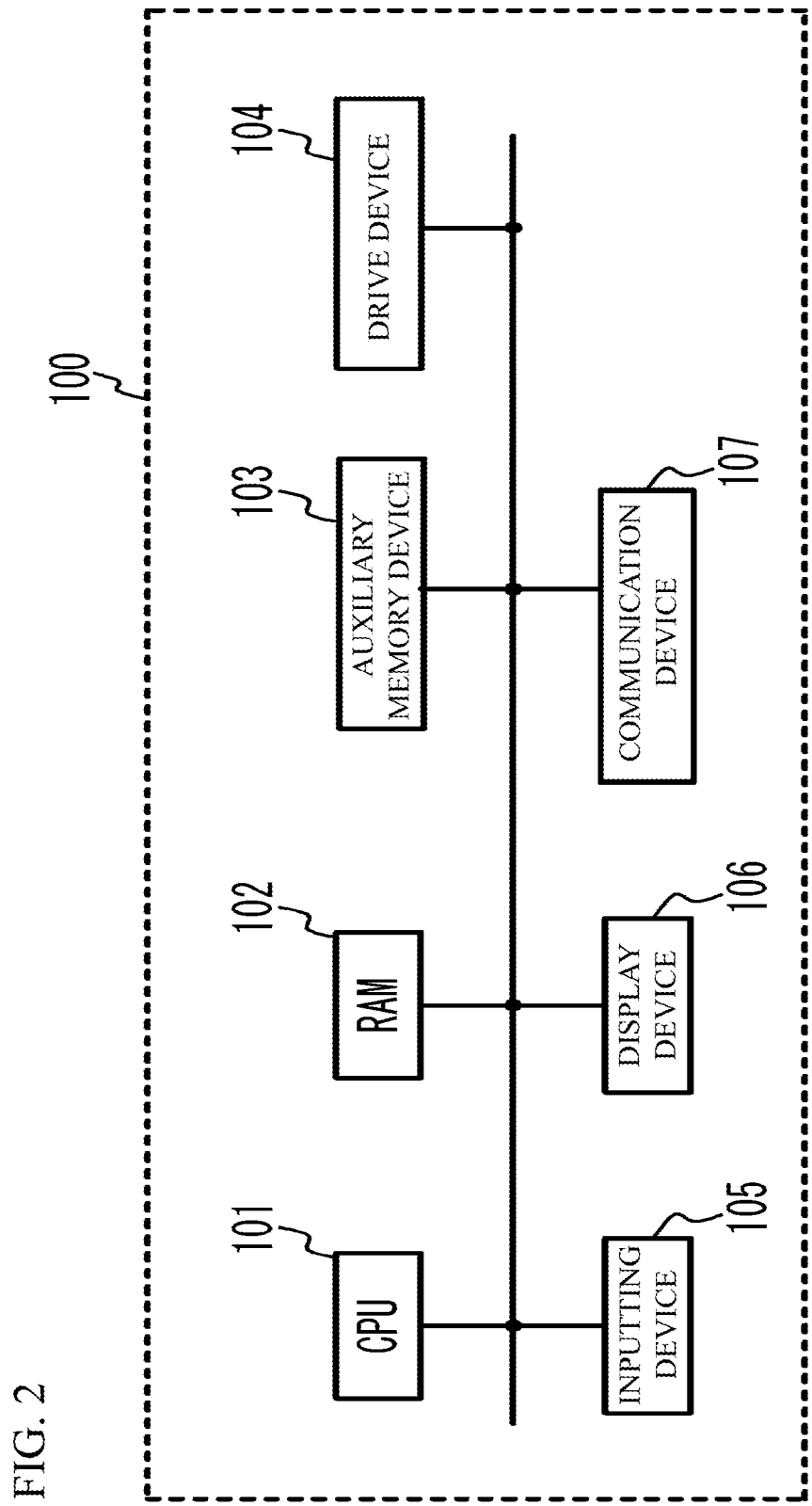
FIG. 2 illustrates a hardware structure of a quality determination device.

FIG. 2 illustrates a hardware structure of a quality determination device 100. As illustrated in FIG. 2, the quality determination device 100 has a CPU (Central Processing Unit) 101, a RAM (Random Access Memory) 102, an auxiliary memory device 103, a drive device 104, an inputting device 105, a display device 106, a communication device 107 and so on. These devices are coupled to each other with a bus or the like. The CPU 101 includes one or more cores. The RAM 102 is a volatile memory temporally storing a program executed by the CPU 101, a data processed by the CPU 101, and so on. The auxiliary memory device 103 is a nonvolatile memory device. The auxiliary memory device 103 may be a SSD (Solid State Drive) such as a ROM (Read Only Memory) or a flash memory, or a hard disk driven by a hard disk drive. The drive device 104 is such as a DVD-ROM drive, an USB terminal or the like. The drive device 104 may read a program and so on from a storage medium storing a program and makes the auxiliary memory device 103 store the program and so on. The inputting device 105 is a device with which a user inputs information. The inputting device 105 is such as a keyboard, a mouse or the like. The display device 106 is such as a liquid crystal display or the like and shows results of processes. The communication device 107 is a device for transmitting information to an outer device or receiving information from the outer device. The CPU 101 executes a quality determination program stored in the auxiliary memory device 103. Thus, functions of the quality determination device 100 are achieved. The functions may be structured with dedicated circuits or the like.

Figure 3:
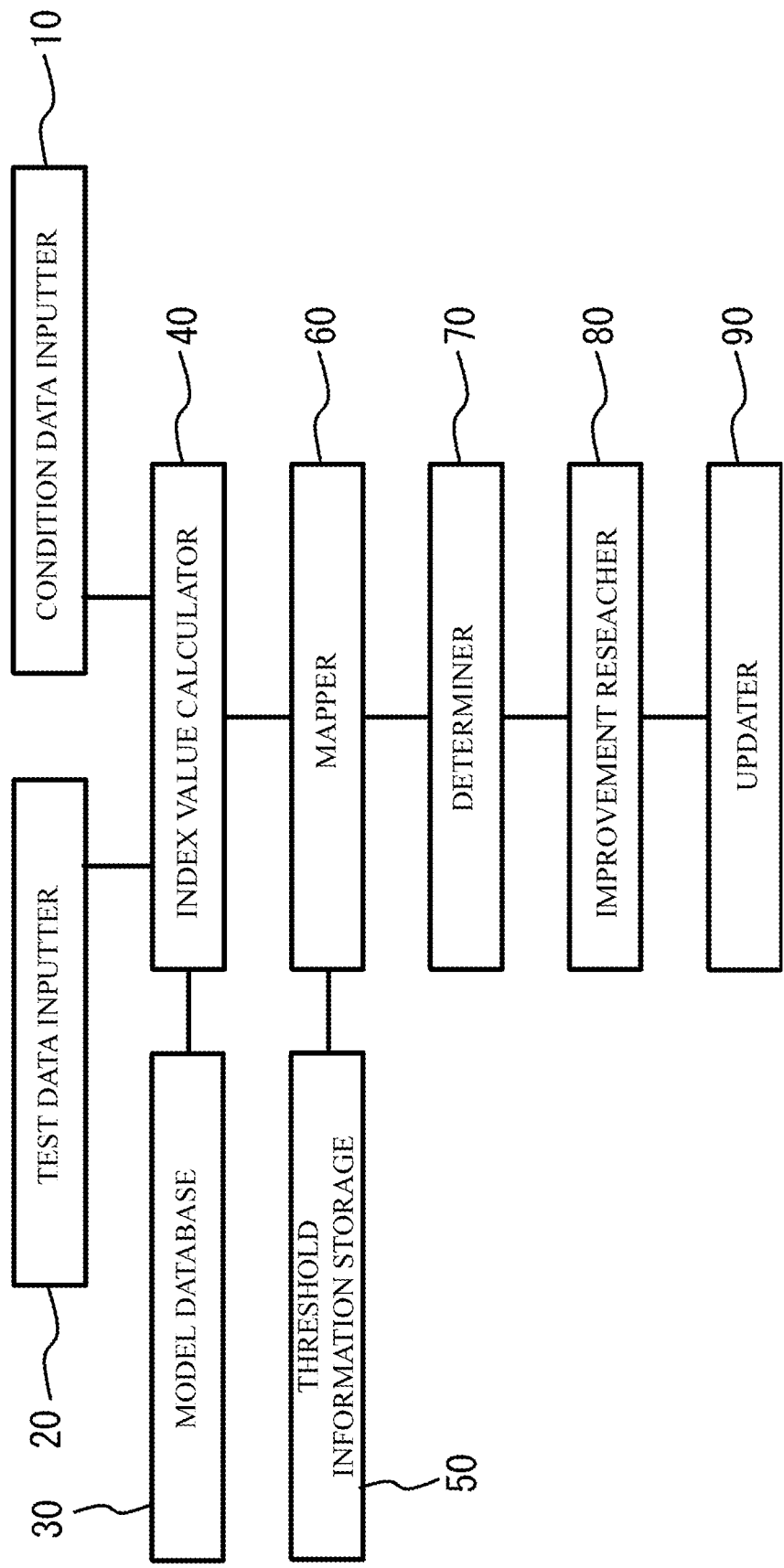
FIG. 3 illustrates a block diagram of each function of a quality determination device.

FIG. 3 illustrates a block diagram of each function of the quality determination device 100. As illustrated in FIG. 3, the quality determination device 100 includes a condition data inputter 10, a test data inputter 20, a model database 30, an index value calculator 40, a threshold information storage 50, a mapper 60, a determiner 70, an improvement researcher 80, an updater 90 and so on.

Figure 4:
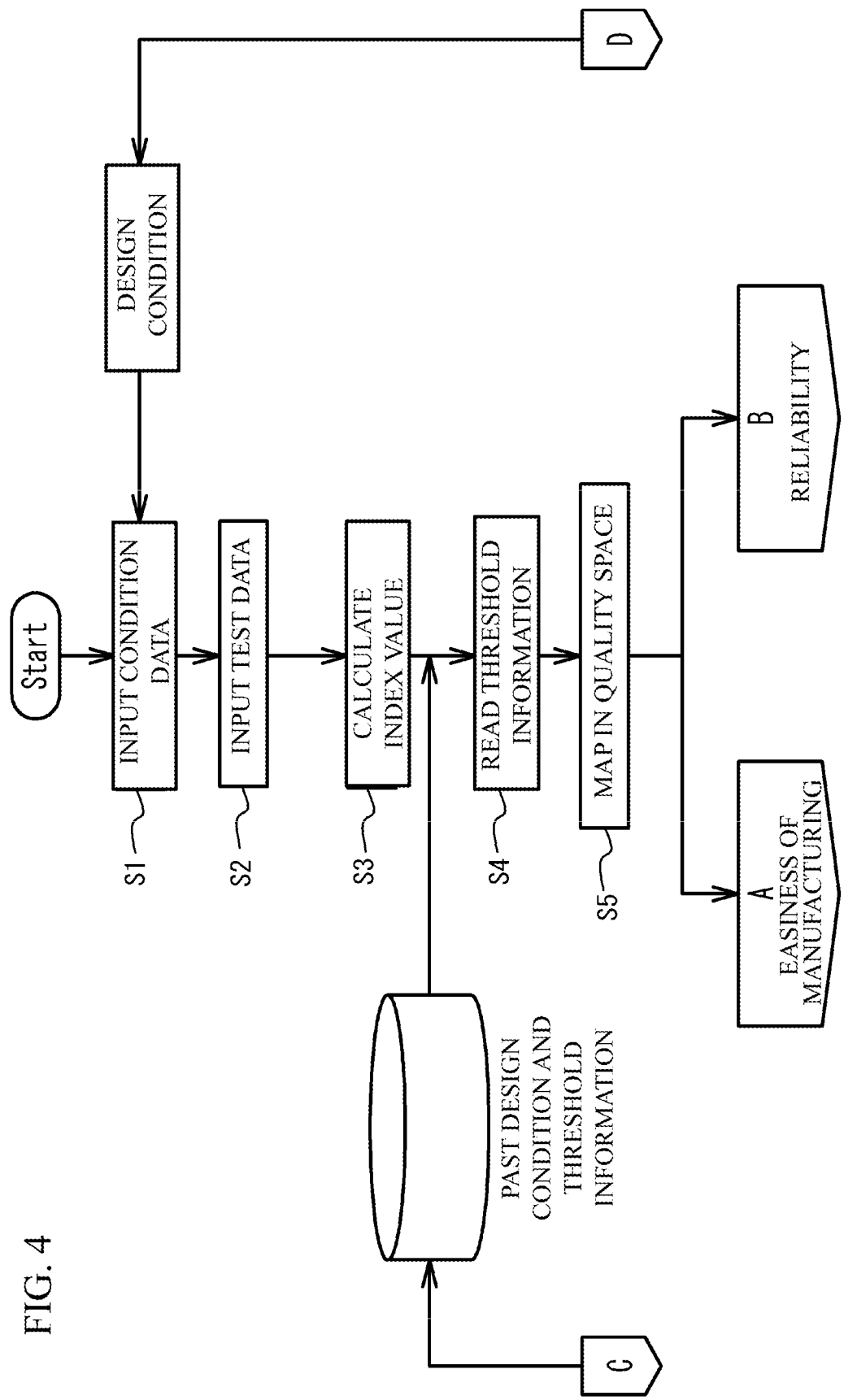
FIG. 4 illustrates a flowchart of a quality determination process executed by a quality determination device.
Figure 5:
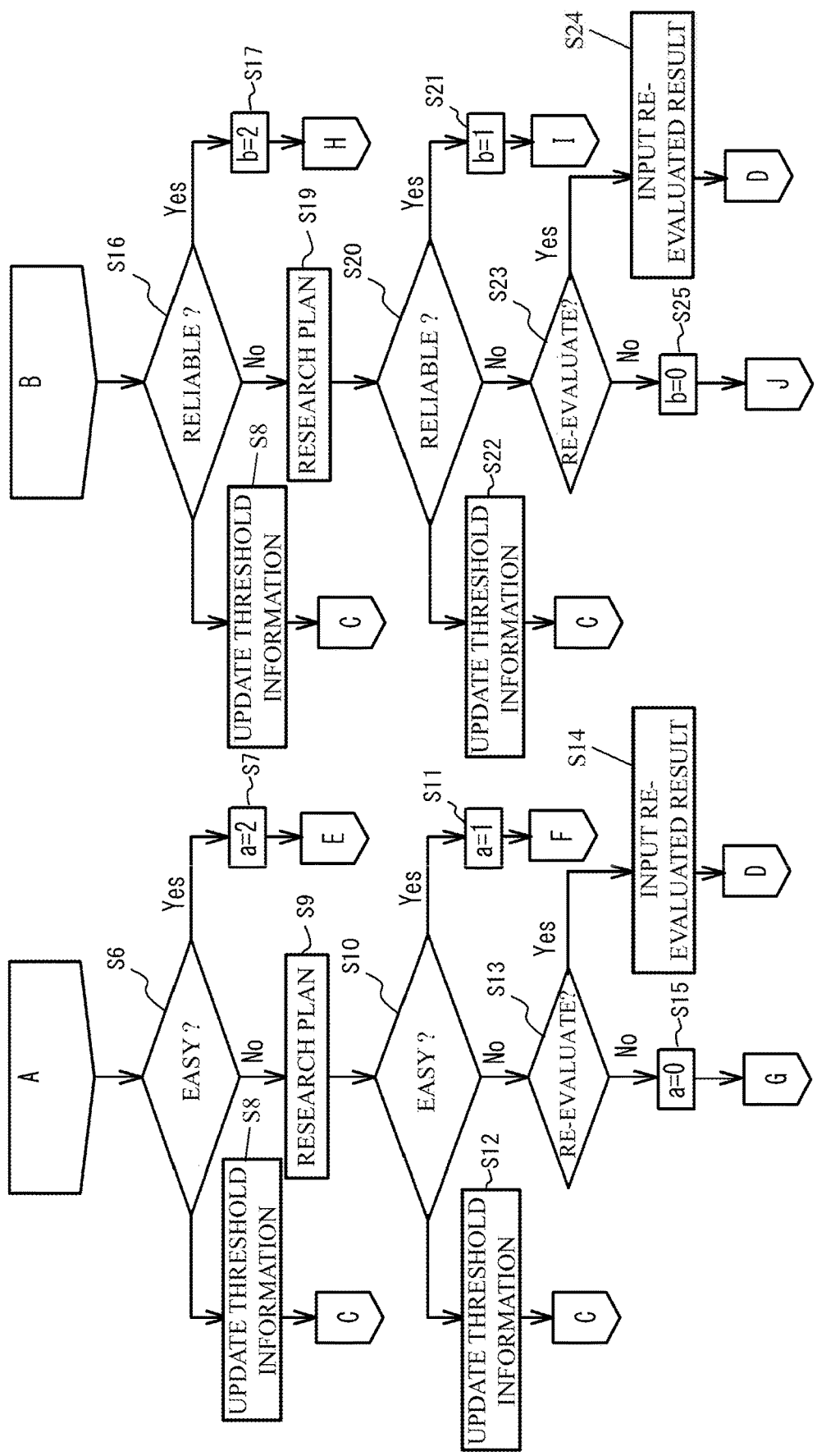
FIG. 5 illustrates a flowchart of a quality determination process executed by a quality determination device.
Figure 6:
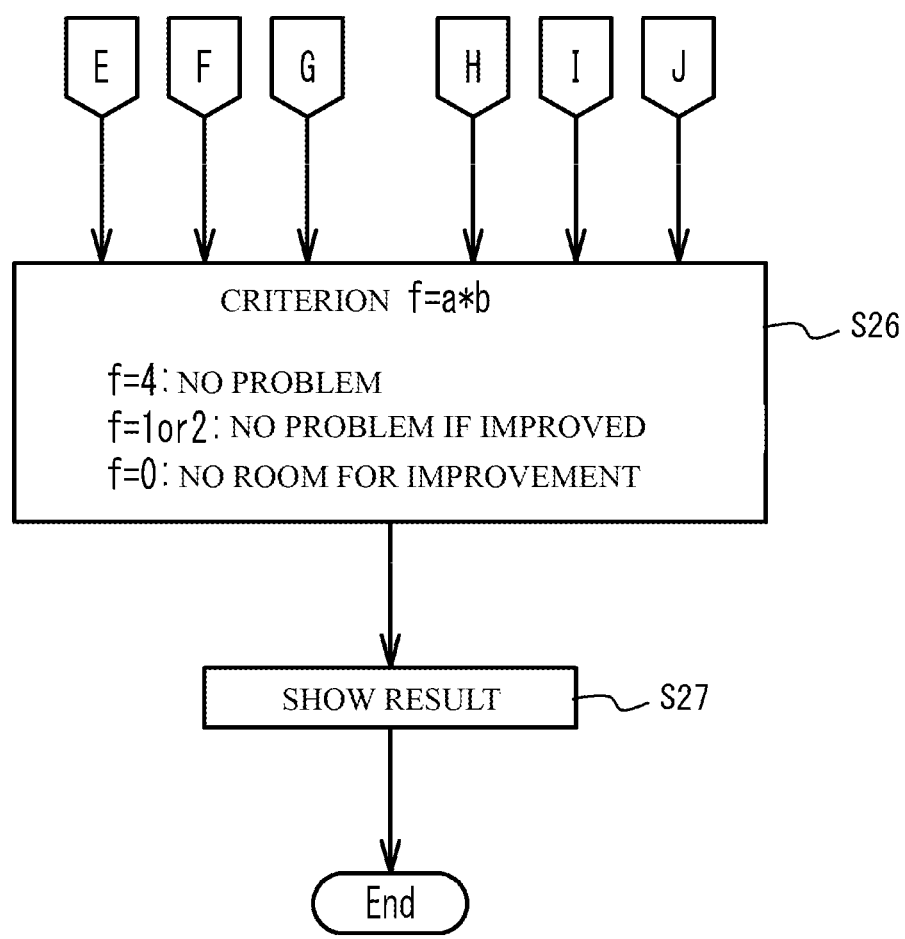
FIG. 6 illustrates a flowchart of a quality determination process executed by a quality determination device.

FIG. 4 to FIG. 6 illustrate a flowchart of a quality determination process executed by the quality determination device 100. A description will be given of the quality determination process executed by the quality determination device 100, on the basis of FIG. 3 to FIG. 6.

The condition data inputter 10 receives data of a design condition of each component of the package product 200 that is an object of which quality is determined (Step S1). The data of the design condition includes a structure data (designed data) such as sizes, thicknesses of layers or the like of the device 201 and the substrate 202 that are objects of which quality is determined. The data of the design condition includes a restriction condition on which a relationship between the device 201 and the substrate 202 or a design direction of the device 201 and the substrate 202 is influenced. The data of the design condition includes a target value such as a yield percentage indicating a standard of reliability. The data of the design conditions are input via the inputting device 105 by a user.

Next, the test data inputter 20 receives a test data of each device of the package product 200 that is an object of which quality is determined (Step S2). For example, the test data is a test data of each of the device 201 and the substrates 202 in an item state. For example, the test data includes temperature profile of a warp amount. The test data is input through the inputting device 105 by a user.

Figure 7:
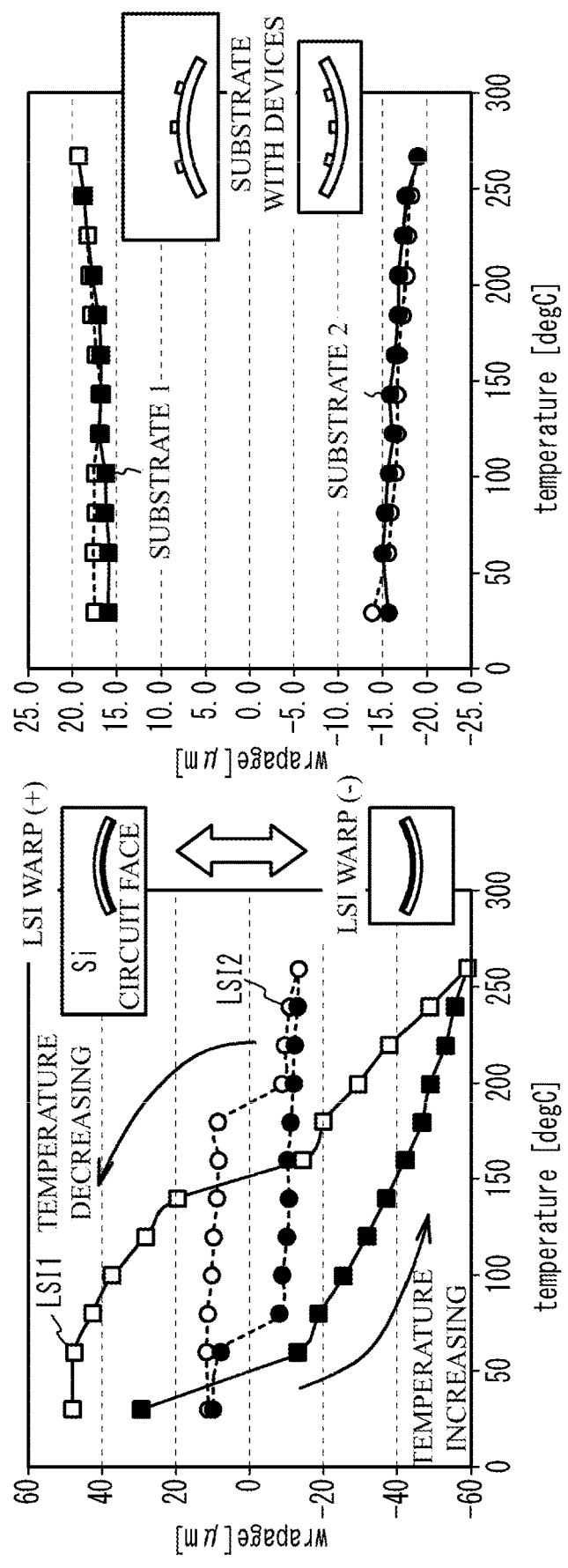
FIG. 7A and FIG. 7B illustrate test results in an item state.

FIG. 7A and FIG. 7B illustrate the test results in an item state. FIG. 7A illustrates a relationship between the temperature and the warp amount of the device 201. In FIG. 7A, a relationship between two types of the device 201 (LSI1 and LSI2) is illustrated. In FIG. 7A, test results of temperature increasing and test results of temperature decreasing are separately illustrated. FIG. 7B illustrates a relationship between the temperature and the warp amount of the substrate 202. In FIG. 7B, a relationship between two types of the substrate 202 (substrate 1 and substrate 2) is illustrated. In FIG. 7B, test results of temperature increasing and test results of temperature decreasing are separately illustrated. With respect to the device 201, a direction in which a side opposite to a circuit face extends and warps indicates plus. With respect to the substrate 202, a direction in which a face on which a device is mounted extends and warps indicates plus. A typical measurement method of the warp is a Moire interference method standardized in accordance with JESD22B112 or JEITA ED-7306 or the like.

Next, the index value calculator 40 reads the model database 30 and reads a quality determination model corresponding to the design condition which is input into the condition data inputter 10. The quality determination model includes indices used for the quality determination. The index value calculator 40 calculates values of indices included in the quality determination model, with use of the test data which is input to the test data inputter 20 (Step S3). In the embodiment, the quality determination model includes three indices of a first index to a third index as indices for evaluating the warp data. Therefore, the index value calculator 40 calculates the first index to the third index, with respect to a combination of assemblies which is an object of which quality is determined.

The first index $I_1$ may be expressed by the following formula (1).

$$I_1 = \bar{x} \cdot \bar{y} \qquad \text{[Formula 1]}$$

The first index $I_1$ is an index of the direction of the warp. The x bar indicates an average value of the warp of the device 201. The y bar indicates an average value of the warp of the substrate 202. When the first index $I_1$ is positive, the directions of the warps are the same as each other. When the first index $I_1$ is negative, the directions of the warps are different from each other.

The second index $I_2$ may be expressed by the following formula (2).

$$I_2 = \frac{x_{max} - x_{min}}{y_{max} - y_{min}} \quad \text{[Formula 2]}$$

The second index $I_2$ is an index of the total warp amount. $x_{max}$ indicates a maximum value of the warp of the device 201. $x_{min}$ indicates a minimum value of the warp of the device 201. $y_{max}$ indicates a maximum value of the warp of the substrate 202. $y_{min}$ indicates a minimum value of the warp of the substrate 202. In this manner, the second index $I_2$ indicates a ratio of fluctuation amounts of the warp of the device 201 and the substrate 202. It is possible to compare each largeness of the warp fluctuation amount, on the basis of the second index $I_2$.

The third index $I_3$ is a correlation coefficient. When the third index $I_3$ is a positive value, the device 201 and the substrate 202 warp in the same direction in accordance with the temperature changing. When the third index $I_3$ is a negative value, the device 201 and the substrate 202 warp in directions which are opposite to each other, in accordance with temperature changing.

Figure 8:
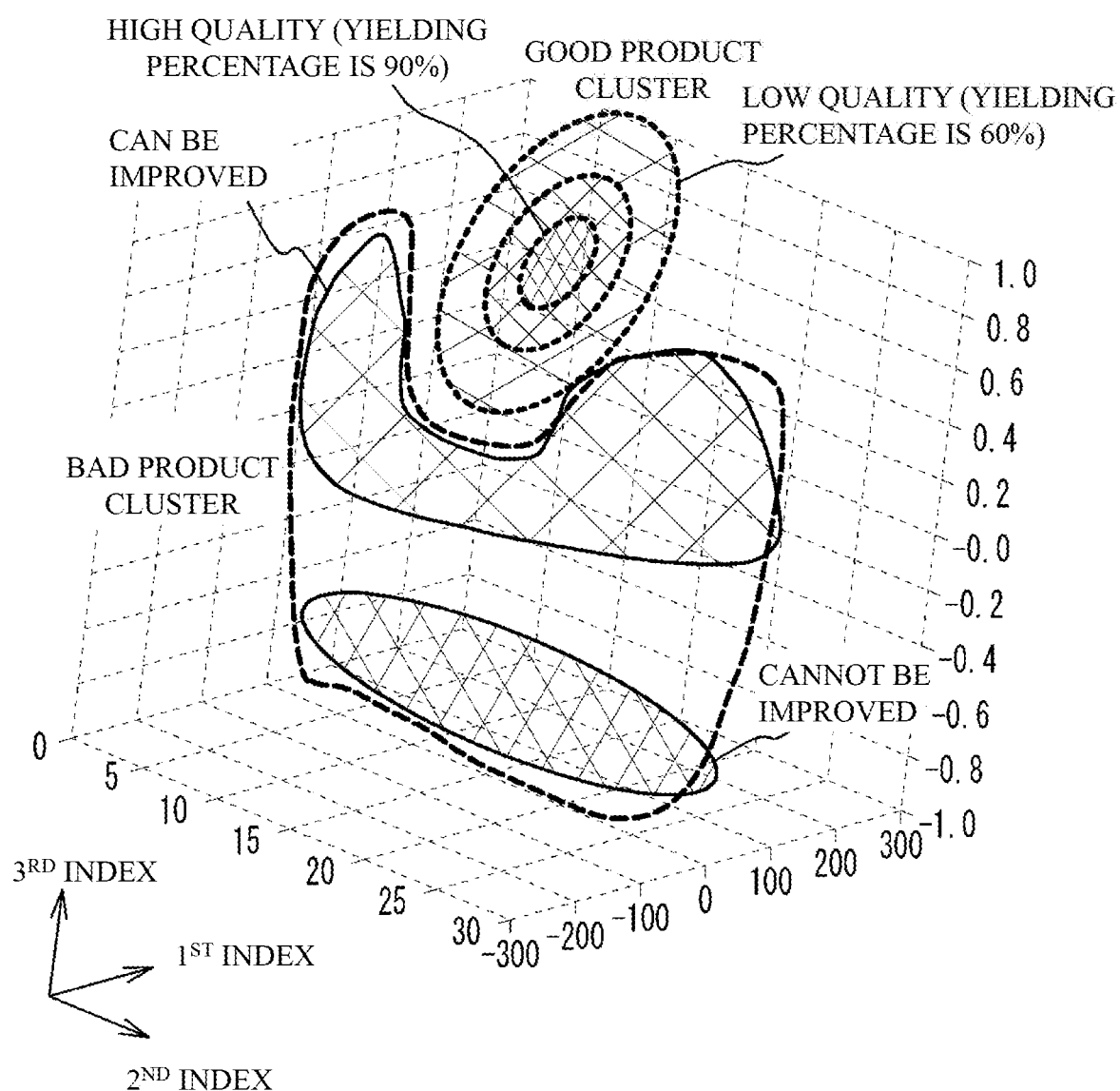
FIG. 8 illustrates threshold information.

Next, from the threshold information storage 50, the mapper 60 reads the threshold information as a quality determination standard in a quality determination space (Step S4). FIG. 8 illustrates the threshold information. Three axes of FIG. 8 indicate the first index $I_1$, the second index $I_2$ and the third index $I_3$. The threshold information include a good product cluster and a bad product cluster. The good product cluster is a combination range of the first index $I_1$ to the third index $I_3$, which is determined as a good product. The bad product cluster is a combination range of the first index $I_1$ to the third index $I_3$, which is determined as a bad product. The bad product cluster includes a cluster which can be improved and a cluster which cannot be improved. The cluster which can be improved is a combination range of an assembly which is determined as a bad product but can be included in the good product cluster when at least a part of the design condition data is changed. The good product cluster includes a plurality of quality clusters (for example, a low quality cluster, a middle quality cluster and a high quality cluster). In the embodiment, for example, high and low of the quality means high and low of the yielding percentage.

It is possible to make each cluster in advance from quality determination results of the assembly mounting in the past. For example, it is possible to appropriately make each cluster, on the basis of propriety or the yielding percentage of the mounting which is subjected to the assembly mounting to the reliability evaluation. For example, it is possible to make each cluster on the basis of hearing from an experienced person. It is also possible to set a threshold as a function, by performing a cluster analysis such as a k-means method or a cluster analysis with use of a model such as SVM (Support Vector Machine). It is also possible to set a detail boundary face by performing a sampling of points near the threshold in the cluster and using a response surface method. It is possible to make each cluster by performing a machine learning of accumulated evaluation results in the past or simulation results.

Figure 9:
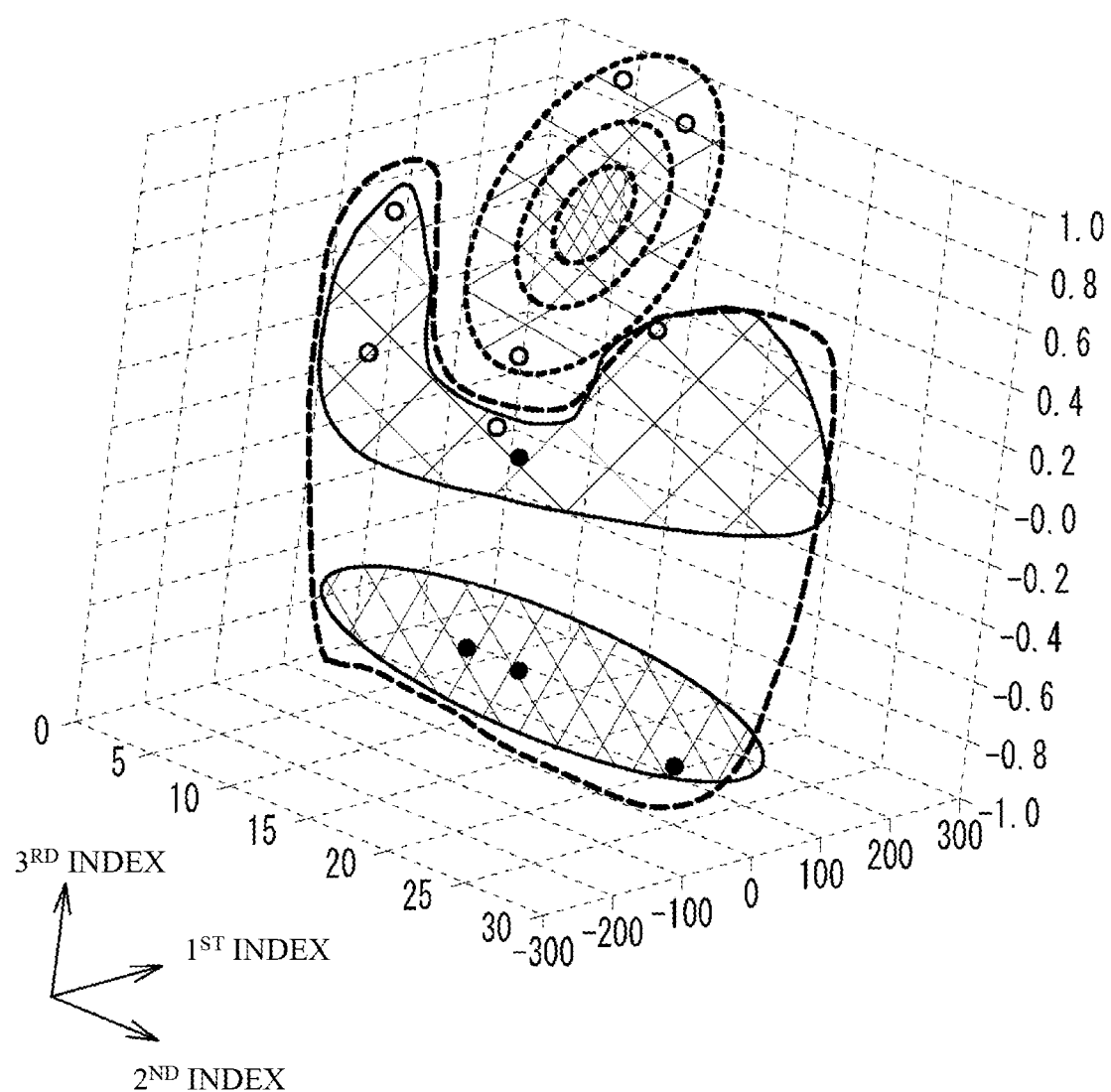
FIG. 9 illustrates results of mapping.

Next, in the quality determination space, the mapper 60 maps quality of the package product 200 after the assembling in accordance with the design condition, with use of the test results of the device 201 and the substrate 202 (Step S5). FIG. 9 illustrates the results of the mapping. In FIG. 9, a plurality of combinations of the assembly are mapped into the good product cluster, the cluster which can be improved, and the cluster which cannot be improved. In an actual quality determination, the number of the object subjected to the quality determination is one. Therefore, in the actual quality determination, one point is plotted.

The determiner 70 determines whether manufacturing of the product is easy or not (determination A) and whether the product is reliable or not (determination B), with use of the results of the mapping. When the manufacturing of the product is easy, there is no problem in the assembly mounting. Therefore, when the manufacturing of the product is easy, a mapping result is positioned in the good product cluster. When the product is reliable, the yielding percentage is the target value or more. Therefore, when the product is reliable, the product is positioned in the quality cluster of which the mapping result (yielding percentage) in the good product cluster is the target value or more.

As illustrated in a left side of FIG. 5, after execution of Step S5, the determiner 70 determines whether the manufacturing of the product is easy or not (Step S6). When the mapping result is positioned in the good product cluster, it is determined that the manufacturing of the product is easy. When the mapping result is not positioned in the good product cluster, it is not determined that the manufacturing of the product is easy. When it is determined as "Yes" in Step S6, the determiner 70 outputs "a=2" (Step S7). Regardless of the determination result, the updater 90 updates the threshold information stored in the threshold information storage 50 by machine learning with use of the mapping result and the determination result (Step S8).

When it is determined as "No" in Step S6, the improvement researcher 80 researches an improvement plan by changing at least a part of the design condition data (Step S9). For example, the improvement researcher 80 researches a design, a process condition or the like with which the coordinate position in the quality determination space can be included in the good product cluster, by performing a sensitivity analysis.

Next, the determiner 70 re-determines whether manufacturing of the product on which the research result of the improvement researcher 80 is influenced is easy (Step S10). When a design or a process condition in which the coordinate in the quality determination space is included in the good product cluster is found, it is determined that manufacturing of the product is easy. When the design or the process condition in which the coordinate in the quality determination space is included in the good product cluster is not found, it is not determined that manufacturing of the product is easy. When it is determined as "Yes" in Step S10, the determiner 70 outputs "a=1" (Step S11). Regardless of the determination result, the updater 90 updates the threshold information stored in the threshold information storage 50 by machine learning with use of the researched result and the determination result (Step S12).

When it is determined as "No" in Step S10, the improvement researcher 80 re-evaluates the design condition data and determines whether the coordinate position in the quality determination space is included in the good product cluster after the re-evaluation (Step S13). When it is determined as "Yes" in Step S13, the re-evaluated design condition data is input into the condition data inputter 10 (Step S14). After that, Step S1 is re-executed. When it is determined as "No" in Step S13, the determiner 70 outputs "a=0" (Step S15).

As illustrated in a right side of FIG. 5, after execution of Step S5, the determiner 70 determines whether the product is reliable or not (Step S16). When the yielding percentage of the mapping result is the target value or more, it is determined that the product is reliable. When the yielding percentage of the mapping result is less than the target value, it is not determined that the product is reliable. When it is determined as "Yes" in Step S16, the determiner 70 outputs "b=2" (Step S17). Regardless of the determination result, the updater 90 updates the threshold information stored in the threshold information storage 50 by machine learning with use of the mapping result and the determination result (Step S18).

When it is determined as "No" in Step S16, the improvement researcher 80 researches an improvement plan by changing at least a part of the design condition data (Step S19). For example, the improvement researcher 80 researches a design, a process condition or the like with which the coordinate position in the quality determination space can be included in a quality cluster whose yielding percentage is a target value or more, by performing a sensitivity analysis.

Next, the determiner 70 re-determines whether product on which the research result of the improvement researcher 80 is influenced is reliable (Step S20). When a design or a process condition in which the coordinate position in the quality determination space is included in the good product cluster whose yielding percentage is the target value or more is found, it is determined that the product is reliable. When the design or the process condition in which the coordinate position in the quality determination space is included in the good product cluster whose yielding percentage is the target value or more is not found, it is not determined that the product is reliable. When it is determined as "Yes" in Step S20, the determiner 70 outputs "b=1" (Step S21). Regardless of the determination result, the updater 90 updates the threshold information stored in the threshold information storage 50 by machine learning with use of the researched result and the determination result (Step S22).

When it is determined as "No" in Step S20, the improvement researcher 80 re-evaluates the design condition data and determines whether the coordinate position in the quality determination space is included in the good product cluster whose yielding percentage is the target value or more after the re-evaluation (Step S23). When it is determined as "Yes" in Step S23, the re-evaluated design condition data is input into the condition data inputter 10 (Step S24). After that, Step S1 is re-executed. When it is determined as "No" in Step S23, the determiner 70 outputs "b=0" (Step S25).

When anyone of Step S7, Step S11 and Step S15 is executed and anyone of Step S17, Step S21 and Step S25 is executed, the determiner 70 performs synthetic determination (Step S26). For example, the determiner 70 calculates "f=a×b". The determiner 70 determines that manufacturing of the product is easy and the product is reliable, when "f" is 4. The determiner 70 determines that there is no problem if improvement is tried, when "f" is 2 or 1. The determiner 70 determines that there is no room for improvement when "f" is 0. The determiner 70 makes the display device 106 show the plotted result in the quality space and the determination result of Step S26 (Step S27).

Next, a description will be given of a concrete quality determination. On the basis of the past results, when the following formula (3) is satisfied and one of the following formula (4) and the following formula (5) is satisfied, it is assumed that the product is positioned in the good product cluster.

$$\text{The first index } I_1 > 0 \tag{3}$$

$$\text{The third index } I_3 > 0 \text{ and the second index } I_2 > 15 \tag{4}$$

$$\text{The third index } I_3 < 0 \text{ and the second index } I_2 < 10 \tag{5}$$

Figure 10:
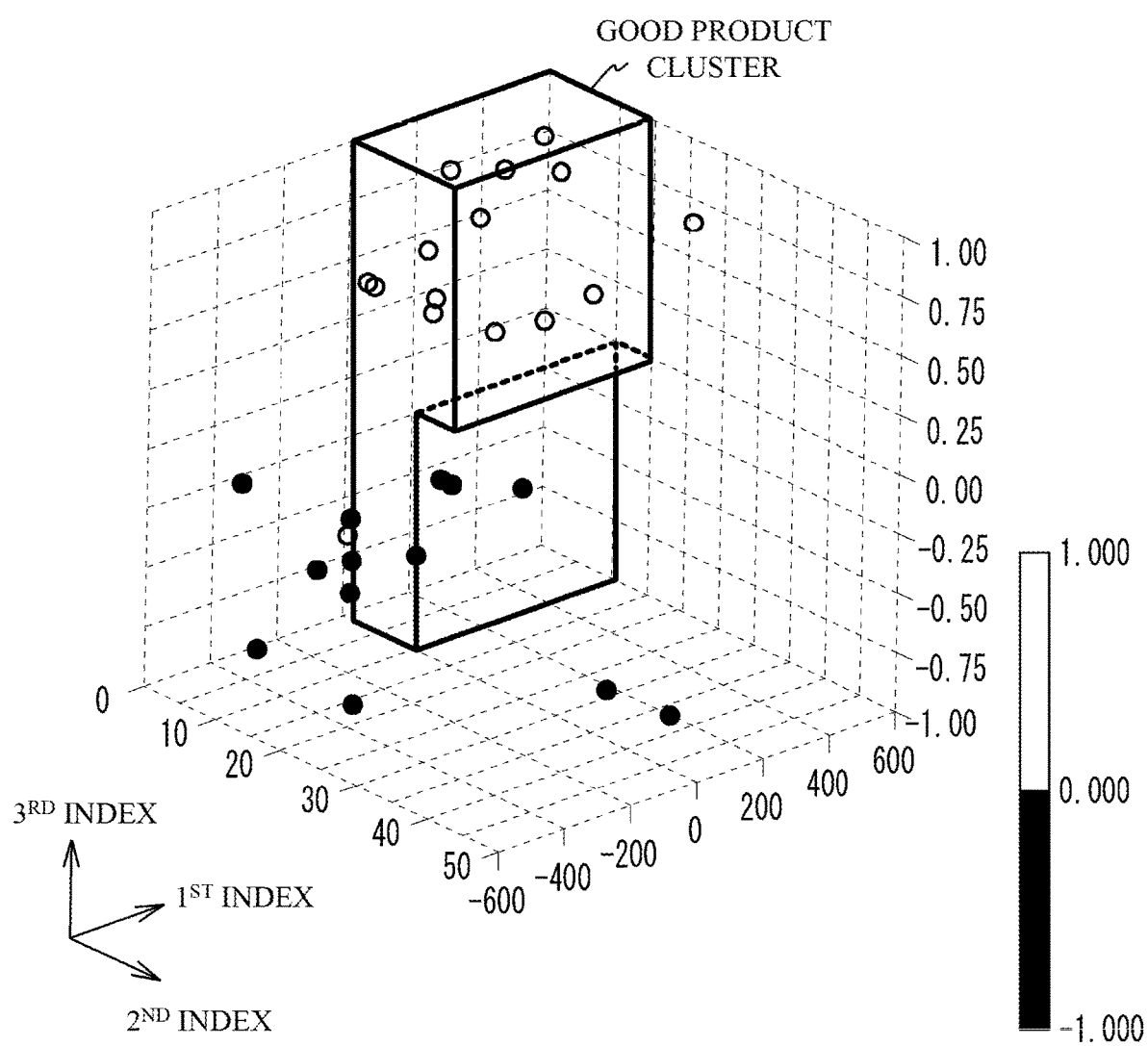
FIG. 10 illustrates mapping results in a quality determination space in which test results of 7 types of a device and 2 types of a substrate in an item state are combined.

FIG. 10 illustrates mapping results in the quality determination space in which test results of 7 types of the device 201 and 2 types of the substrate 202 in an item state are combined. Both of the results of temperature increasing and temperature decreasing are plotted. Therefore, the number of the plotted points is 28. From 14 combinations, it is possible to select three combinations satisfying the conditions of temperature increasing and temperature decreasing.

Figure 11:
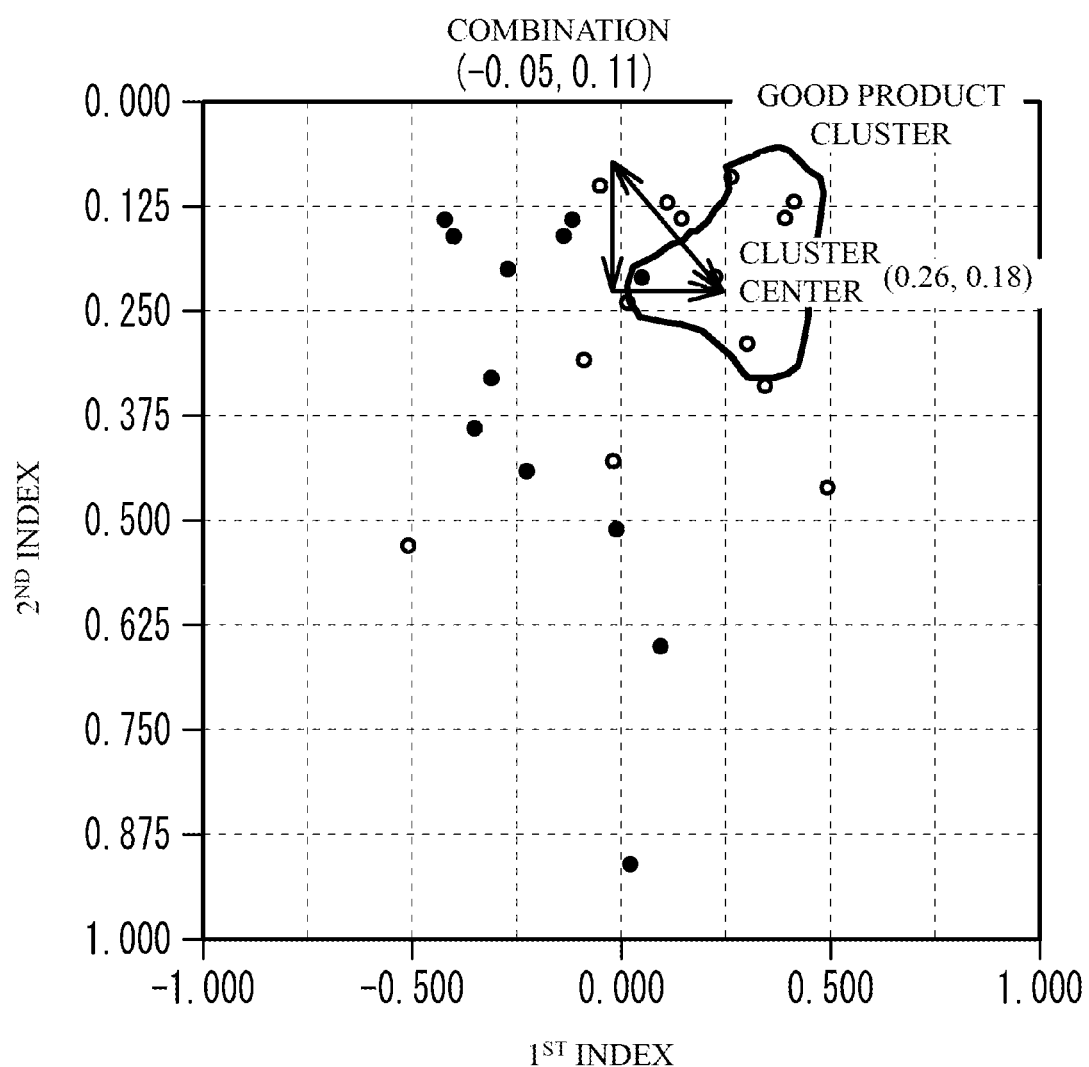
FIG. 11 illustrates indices of normalized warp direction and a map having a plane formed by indices of a total warp amount.

Here, improvement of the combination of the device 201 and the substrate 202 which is near the cluster of the index points of the three combinations of which matching is preferable is researched. Although the indices of the temperature increasing are positioned in a threshold range of which matching is preferable, the indices of the temperature decreasing are not positioned in the threshold range. A pathway of a center of the good product cluster is calculated and the pathway is ranked. Thus, improvement guidance is researched. Each index is normalized in order to calculate the pathway. FIG. 11 illustrates indices of the normalized warp direction and a map having a plane formed by the indices of the total warp amount. The indices of the warp direction are far. Therefore, guidance that when an effect is enlarged when the warp direction is changed is obtained. It is necessary to enlarge the thickness of the interconnection layer or reduce the thickness of the device 201 in order to change the warp direction. Therefore, it is necessary to change the design. It is possible to efficiently introduce which parameter is to be changed, by performing the sensitivity analysis.

Figure 13:
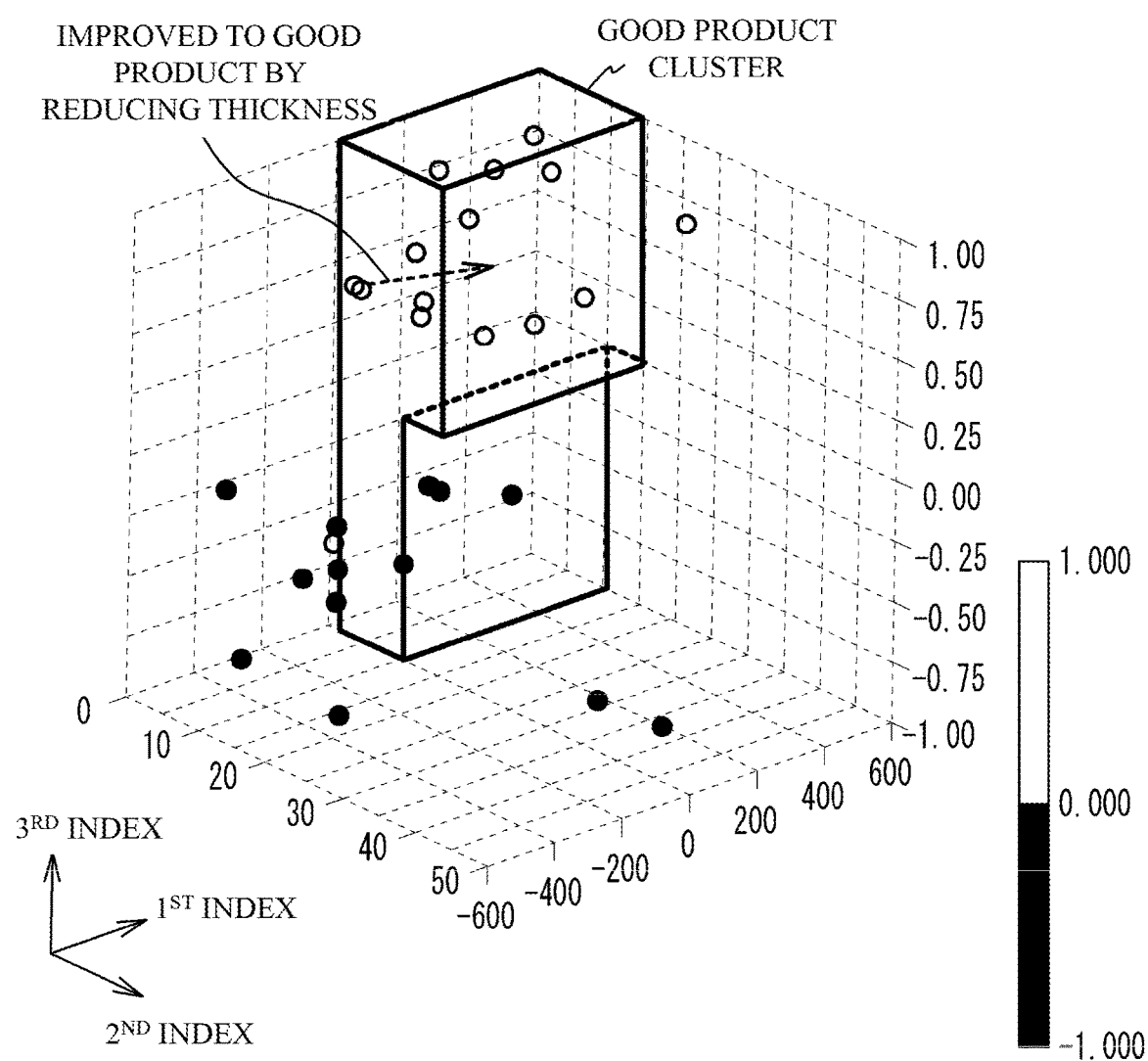
FIG. 13 illustrates accumulated results of improvement researching.

FIG. 12 illustrates the changing results of the indices of the warp direction in a case where the results of the design guidance is received and the thickness of the device 201 is changed from 100 µm to 70 µm. It is possible to improve the position to the center of the cluster by changing the warp direction from the minus direction to the plus direction. From the result, an arrow is illustrated from the initial plotted indices of the device 201 and the substrate 202 toward the cluster center in the quality determination space. The current researched results are recorded. The results are accumulated as future know-how. FIG. 13 illustrates the accumulated results.

In the embodiment, the quality of the package product 200 after the assembling of a plurality of devices of the package product 200 under the predetermined design condition is mapped in the quality determination space, with use of the test results of the plurality of devices. In accordance with the mapping result, the quality of the package product 200 is determined. It is therefore possible to determine the quality of the package product before the assembling. In particular, it is possible to determine the quality of the package product 200 of unknown combinations. When it is determined whether the product can be improved, it is possible to exclude combinations which cannot be improved even if the process condition and the design are changed. It is therefore possible reduce useless processes.

When the quality determination standard is updated with use of the quality determination result, it is possible to improve the quality determination accuracy. It is possible to determine whether the combination classified into the bad product cluster can be improved or not, by changing at least a part of the design condition and re-determining the quality of the combination. When the display device 106 shows the quality determination result, the user can select a policy whose risk of design re-workings are fewer. It is therefore possible to reduce a total process number. When the quality determination space is used with respect to a plurality of products in the past, the determination standard or the determination accuracy is improved. Therefore, when the process number is grasped in advance, it is possible to make an optimal operation plan of person, goods and money.

Second Embodiment

Figure 14:
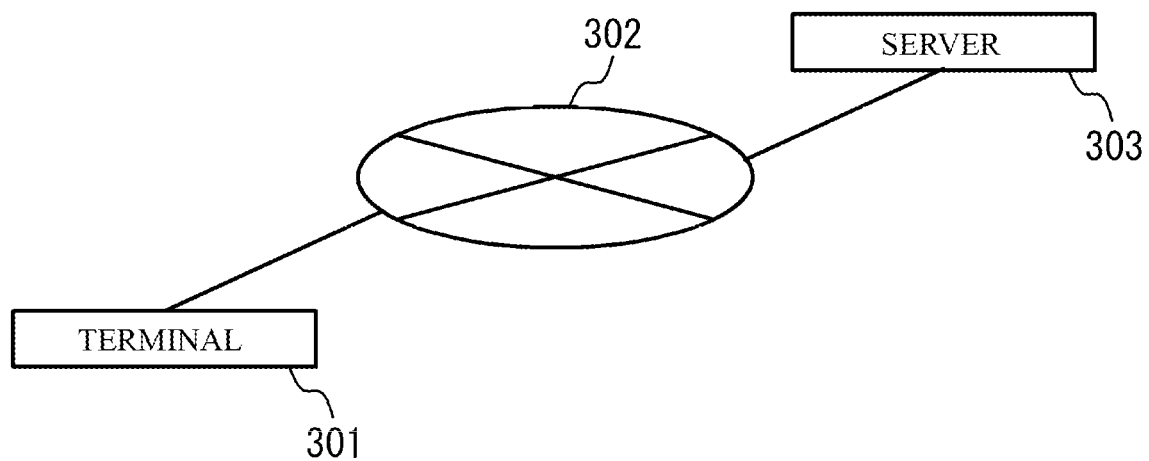
FIG. 14 illustrates a quality determination system in accordance with a second embodiment.

FIG. 14 illustrates a quality determination system in accordance with a second embodiment. As illustrated in FIG. 14, the quality determination system has a structure in which a terminal 301 is coupled with a server 303 via an electrical communication line 302 such as Internet. The terminal 301 has the inputting device 105 and the display device 106 of FIG. 2. The server 303 has the CPU 101, the RAM 102, the auxiliary memory device 103, the drive device 104, the communication device 107 of FIG. 2, and so on. The server 303 achieves each function of FIG. 3. In this manner, the quality determination system may have a structure in which each function of the quality determination device 100 is separated into a plurality of devices through the electrical communication line.

In the above-mentioned embodiments, the mapper 60 acts as an example of a mapper configured to, in a quality determination space, map a quality of a package product in which a plurality of devices are assembled in accordance with a predetermined design condition, with use of each test result of each of the plurality of devices. The determiner 70 acts as an example of a determiner configured to determine a quality of the package product, on a basis of mapping result of the mapping. The updater 90 acts as an example of an updater configured to update a quality determination standard in the quality determination space, with use of a determination result of the determining.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:
1. A quality determination method comprising:
 in a quality determination space, mapping each index of each of a substrate and a device of a package product in which the substrate and the device are assembled by mounting the device on the substrate in accordance with a predetermined design condition, with use of each test result of each of the substrate and the device before the substrate and the device are assembled; and
 determining a quality of the package product, on a basis of mapping result of the mapping,
 the quality determination space is a space having axes of a ratio of warp amount changings of the device and the substrate, a product of average warp amounts of the device and the substrate, and a correlation coefficient in the temperature profile.
2. The method as claimed in claim 1, wherein, in the determining, a threshold or a response surface is set as a quality determination standard in the quality determination space.
3. The method as claimed in claim 1, further comprising:
 updating a quality determination standard in the quality determination space, with use of a determination result of the determining.
4. The method as claimed in claim 1, further comprising:
 changing at least a part of the design condition when it is determined that the package product is bad in the determining; and
 re-determining the quality of the package product with use of a result of the changing.
5. The method as claimed in claim 1, wherein a quality determination standard in the quality determination space is made in advance with use of past quality determination results after assembling.
6. A quality determination device comprising:
 a memory; and
 a processor coupled to the memory and the processor configured to execute a process, the process comprising:
 in a quality determination space, mapping each index of each of a substrate and a device of a package product in which the substrate and the device are assembled by mounting the device on the substrate in accordance with a predetermined design condition, with use of each test result of each of the substrate and the device before the substrate and the device are assembled; and
 determining a quality of the package product, on a basis of mapping result of the mapping,
 the quality determination space is a space having axes of a ratio of warp amount changings of the device and the substrate, a product of average warp amounts of the device and the substrate, and a correlation coefficient in the temperature profile.
7. The quality determination device as claimed in claim 6, wherein, in the determining, a threshold or a response surface is set as a quality determination standard in the quality determination space.
8. The quality determination device as claimed in claim 6, wherein the process further comprises:
 updating a quality determination standard in the quality determination space, with use of a determination result of the determining.
9. The quality determination device as claimed in claim 6, wherein the process further comprises:
 changing at least a part of the design condition when it is determined that the package product is bad in the determining; and
 re-determining the quality of the package product with use of a result of the changing.
10. The quality determination device as claimed in claim 6, wherein a quality determination standard in the quality determination space is made in advance with use of past quality determination results after assembling.
11. A quality determination system comprising:
 a terminal configured to input each test result of each of a substrate and a device of a package product in an item state and a design condition of the package product;
 a server having a memory and a processor coupled to the memory and the processor configured to execute a process, the process comprising:

in a quality determination space, mapping each index of each of the substrate and the device of the package product in which the substrate and the device are assembled by mounting the device on the substrate in accordance with the design condition, with use of each test result of each of the substrate and the device before the substrate and the device are assembled; and determining a quality of the package product, on a basis of mapping result of the mapping, the quality determination space is a space having axes of a ratio of warp amount changings of the device and the substrate, a product of average warp amounts of the device and the substrate, and a correlation coefficient in the temperature profile.

12. The quality determination system as claimed in claim 11, wherein, in the determining, a threshold or a response surface is set as a quality determination standard in the quality determination space.

13. The quality determination system as claimed in claim 11, wherein the process further comprises:

updating a quality determination standard in the quality determination space, with use of a determination result of the determining.

14. A computer-readable, non-transitory medium storing a program that causes a computer to execute a process, the process comprising:

in a quality determination space, mapping each index of each of a substrate and a device of a package product in which the substrate and the device are assembled by mounting the device on the substrate in accordance with a predetermined design condition, with use of each test result of each of the substrate and the device before the substrate and the device are assembled; and determining a quality of the package product, on a basis of mapping result of the mapping the quality determination space is a space having axes of a ratio of warp amount changings of the device and the substrate, a product of average warp amounts of the device and the substrate, and a correlation coefficient in the temperature profile.

* * * * *